(12) United States Patent
Berfanger et al.

(10) Patent No.: US 6,701,029 B1
(45) Date of Patent: Mar. 2, 2004

(54) RING-WEDGE DATA ANALYSIS OF DIGITAL IMAGES

(75) Inventors: David M. Berfanger, Vancouver, WA (US); Nicholas George, Pittsford, NY (US)

(73) Assignee: Automatic Recognition and Control, Inc., Pittsford, NY (US)

(*) Notice: Subject to any disclaimer, the term of this patent is extended or adjusted under 35 U.S.C. 154(b) by 0 days.

(21) Appl. No.: 09/501,546

(22) Filed: Feb. 9, 2000

Related U.S. Application Data

(60) Provisional application No. 60/163,993, filed on Nov. 8, 1999.

(51) Int. Cl.[7] .................................................. G06K 9/36
(52) U.S. Cl. ...................................... 382/280; 382/281
(58) Field of Search ............................... 382/157, 159, 382/158, 160, 280, 281

(56) References Cited

U.S. PATENT DOCUMENTS 5,274,714 A * 12/1993 Hutcheson et al. .......... 382/157
5,465,308 A * 11/1995 Hutcheson et al. .......... 382/159

OTHER PUBLICATIONS

N. George, S. G. Wang, D. L. Venable, "Pattern recognition using the ring–wedge detector and neural–network software," SPIE, vol. 1134, p. 96, 1989.*

Trygve Randen, John Hakon Husoy, "Filtering for texture classification: a comparative study", IEEE, vol. 21, No. 4, Apr. 1999.*

* cited by examiner

*Primary Examiner*—Amelia M. Au
*Assistant Examiner*—Brian Le
(74) *Attorney, Agent, or Firm*—Jeffrey D. Myers

(57) ABSTRACT

Computer software for and a method of calculating ring-wedge data from a digital image by performing a discrete Fourier transform of the digital image. A discrete autocorrelation, discrete cosine transform, and/or Hadamard transform is also preferably performed, together with providing the results to a neural network (most preferably a fully connected, three-layer, feed-forward neural network with sigmoidal activation functions) to perform pattern recognition on the data.

51 Claims, 13 Drawing Sheets

| 11 | 12 | 13 | ... | 1n | ... |
|---|---|---|---|---|---|
| 21 | 22 | 23 | ... | 2n | ... |
| 31 | 32 | 33 | ... | 3n | ... |
| ⋮ | ⋮ | ⋮ |  | ⋮ |  |
| m1 | m2 | m3 | ... | mn | ... |
| ⋮ | ⋮ | ⋮ |  | ⋮ |  |

Fig. 12

RING-WEDGE DATA ANALYSIS OF DIGITAL IMAGES

CROSS-REFERENCE TO RELATED APPLICATIONS

This application claims the benefit of the filing of U.S. Provisional Patent Application Serial No. 60/163,993, entitled "System and Software for Classification and Recognition Based on Spatial Frequency Sampling and Neural Networks", filed on Nov. 8, 1999, and the specification thereof is incorporated herein by reference.

BACKGROUND OF THE INVENTION

1. Field of the Invention (Technical Field)

The present invention relates to image classification and recognition based on spatial frequency sampling as well as image domain sampling.

2. Background Art

In the early 1970's, the methods used in automatic pattern recognition could be grouped into two categories: those based on edge and edge-angle correlation; and those based on power-spectral density. In connection with aerial images and remote sensing, U.S. Pat. No. 3,687,772 disclosed a robotic-eye photodetector called a ring-wedge photodetector. As shown in FIG. 1, this photodetector preferably has 32 separate annular semi-rings for sampling power spectral density, independently of rotation, and 32 pie-shaped segments devised for readout of edges and edge-angle correlation. The wedge data are scale-invariant. In the recognition system disclosed, the photodetector is placed in the back focal plane of a Fourier-optical processor. The entire system includes a laser illuminator, an input picture being inspected, a Fourier-transform lens, and the ring-wedge photodetector in the back focal plane that is also known as the optical-transform plane. Each of the 64 photodetectors on the ring-wedge photodetector has a separate amplifier and digitizer so that the sampled Fourier transform signal can be coupled into an electronic digital computer.

By gathering data in rings and wedges, very complicated pictures with ten million or so pixels could be coarsely sampled in the optical Fourier transform space and automatic recognition tasks could be accomplished using only 64 feature values. During the following two decades, this analog hybrid opto-electronic system was successful in establishing high accuracy classification and recognition at high speeds (on the order of one decision per millisecond). In recognition of high-resolution photographs it is comparable in accuracy to the matched-filter (an earlier form of prior art), but it is much easier to implement. Notable successes were sorting of photographs of cats versus dogs, black-lung disease determinations, sharpness analysis of hypodermic syringes, wafer inspection, CD inspection, surface roughness determinations, and particle sizing. This system is particularly applicable when the decision/recognition depends upon fine-scale features or texture.

The present invention provides a software system both for recognition and classification of digital images automatically and rapidly. This system is particularly suited to all-digital optical robotics. It can be implemented as a stand-alone system or as a "tool-kit" in a general image processing environment that includes other means for processing, filing, and sorting images. The all-digital system of the invention, using both spatial transform features and image features, can automatically classify or recognize any image group with high accuracy, matching the best performance that human photointerpreters are capable of. The software recognition system is highly advantageous over the prior art in that it is affordable, costing only a small fraction of that for the laser-optical hybrid of the prior art. It is user friendly because neural network training routines yield superior decision performance. The invention has demonstrated superior performance in a wide variety of applications including classification of image quality in a manner that is widely independent of scene content, recognition of handwriting in a manner widely independent of textual content, and classification into multiple bins or categories. Go and no-go production testing quality of images used in photolithography and automatic sizing of particles as in talcum or pharmaceuticals are all viable application areas for this invention. The present invention is also applicable in a robotic control of the shutter of a smart camera, i.e., a picture is taken only if the recognition system okays the scene content, erg., for sharpness of image, that eyes are all open, for smiling expressions, and the like.

SUMMARY OF THE INVENTION (DISCLOSURE OF THE INVENTION)

The present invention is of computer software for, computer media with computer software for, and a method of calculating ring-wedge data from a digital image comprising performing a discrete Fourier transform of the digital image. In the preferred embodiment, a calculation is also performed of discrete autocorrelation, discrete cosine transform, and/or Hadamard transform. The ring wedge sampling preferably comprises calculating $$m_j = \sum_{u=0}^{N-1} \sum_{v=0}^{M-1} |\tilde{F}(u, v)| \tilde{M}_j(u, v),$$

where $m_j$ is a jth measurement over a sampling area to which each pixel's degree of membership is given by $\tilde{M}_j(u,v)$, $$\tilde{F}(u, v) = \sum_{n=0}^{N-1} \sum_{m=0}^{M-1} f(n, m) \exp\left[-2\pi\left(\frac{un}{N} + \frac{vm}{N}\right)\right],$$

where $f(n,m)$ comprises digital image pixel values with $0 \leq n < N$, $0 \leq u < N$, $0 \leq m < M$, and $0 \leq v < M$. The sampling calculation preferably determines each pixel's degree of membership by employing sampling regions for ring and wedge regions defined as:

$$R_j = \left\{(f_x, f_y): \rho_j \leq \sqrt{f_x^2 + f_y^2} < \rho_j + \Delta\rho_j, \phi_{\min} \leq \tan^{-1}\frac{f_y}{f_x} < \phi_{\min} + \pi\right\},$$

and $$R_j = \left\{(f_x, f_y): \rho_{\min} \leq \sqrt{f_x^2 + f_y^2} < \rho_{\max}, \phi_j \leq \tan^{-1}\frac{f_y}{f_x} < \phi_j + \Delta\phi_j\right\},$$

where $p_j$ is the radial distance from the origin to the inner radius of the jth detector region, and $\Delta\rho_j$ is its radial width, and $\phi_j$ is the angular distance from the $f_x$ axis to the leading edge of the jth detector region and $\Delta\phi_j$ is its angular width. The sampling may be accomplished by determining each pixel's degree of membership as appropriate for either of two preferred methods: bin-summing or mask-summing, as in the descriptions to follow. The ring-wedge data is preferably provided to a neural network (most preferably a fully connected, three-layer, feed-forward neural network with sigmoidal activation functions) to perform pattern recognition on the data. The neural network may be implemented in hardware or software, as well understood by one of ordinary skill in the art. The ring-wedge data may be used in analysis of an images such as fingerprint images, images of particles, images of human faces, and satellite images, and the analysis may be for tasks such as object recognition, image quality assessment, and image content classification.

A primary object of the invention is to allow for the rapid prototyping of practical recognition systems by providing a highly effective, consistent data format for making recognition decisions.

Another object of the invention is to provide the ability to apply either of two preferred methods to any number of subshades from a single input image. In this way spatial location and other image domain information can be combined with the ring-wedge format to produce superior recognition.

A primary advantage of the invention is the provision of a digitally calculated set of dimensionally reduced data to permit practical machine learning methods to determine appropriate means of separating these data into redefined groupings.

Another advantage of the invention is that its straightforward input-to-output data flow admits it to a modular design structure allowing easy interaction with other data processing methods.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 12 is a schematic representation of image tiling according to the invention.

Figure 1:
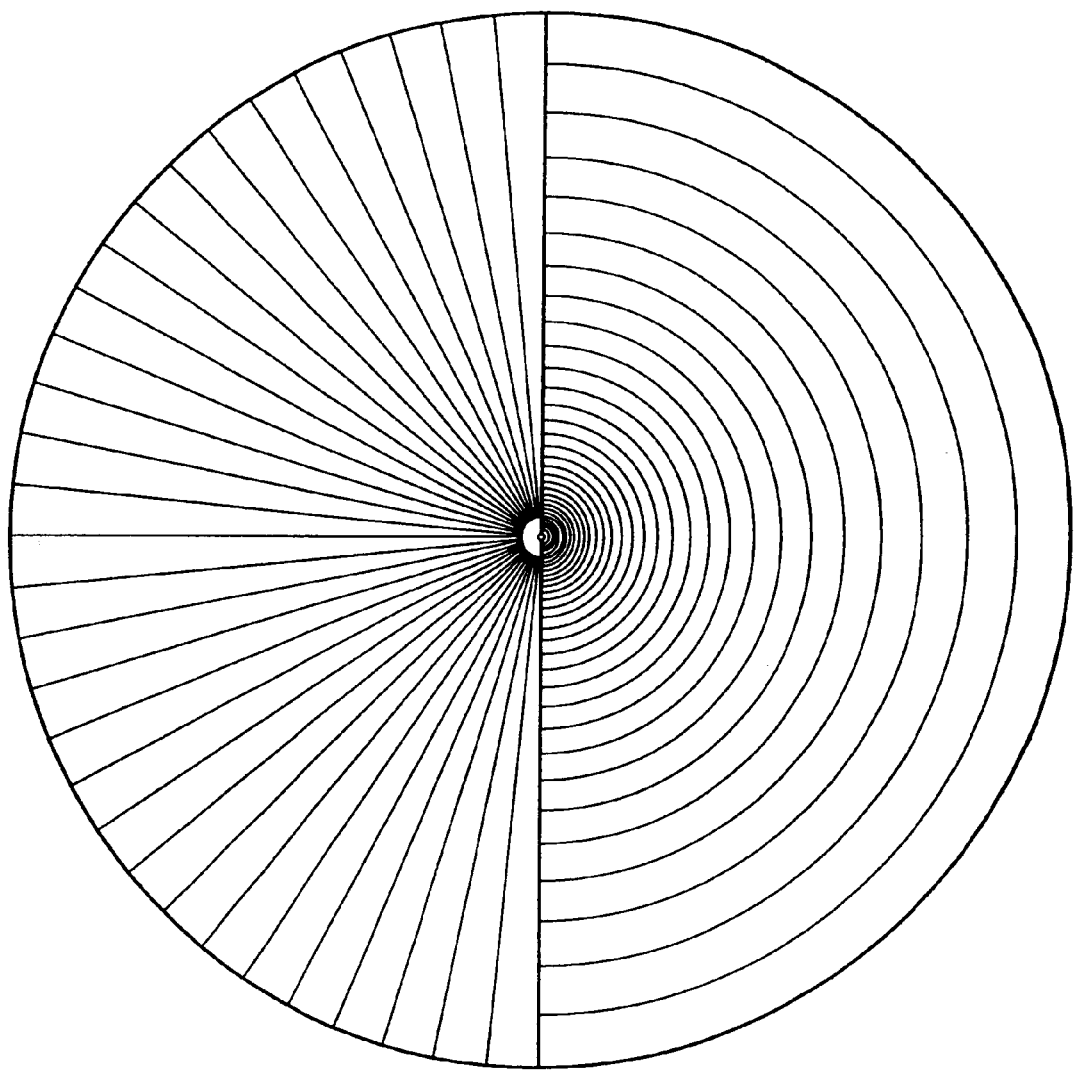
FIG. 1 is a schematic diagram of the prior art ring-wedge geometry preferably used in the all-digital calculation of the ring-wedge data format of the invention from digital input images.

DESCRIPTION OF THE PREFERRED EMBODIMENTS (BEST MODES FOR CARRYING OUT THE INVENTION)

The present invention is of an automatic recognition system and method that has the capability to classify or recognize a wide variety of images grouped objectively by photointerpreters or other means. The invention can be configured for stand-alone use in a digital computer or incorporated as a tool-kit in a general image processing environment.

The methods of the invention include spatial frequency sampling of an arbitrary image with selected pre-processing on one or several separate channels. These data are coupled into a neural network that is trained using a learning set of images that have been selected to span the base of classification or recognition. For the spatial frequency sampling according to the invention, the preferred embodiment is an all-digital form of the ring-wedge photodetector (772-George) and incorporating two important variations. For the neural network, excellent results are obtained using a fully connected, three-layer, feed-forward configuration with sigmoidal activation functions. The invention can also include the use of nonlinear data processing such as rank ordering to provide robustness, edge extraction preprocessing, and error images as well as the original image.

Further, the invention comprises methods and software for calculating the ring-wedge data format from digital images. The methods and software are useful for constructing automatic pattern recognition systems that use pictorial imagery as input data. These applications include but are not limited to object recognition, image quality assessment, and image content classification. The methods can be applied generally to grayscale, color, and/or abstract images that may consist of an arbitrary number of data channels. The software also allows for the ring-wedge data format to be applied to any number of subimages taken from a single input image. In this way the software allows for systems to be constructed that use both spatial location and other image domain information with ring-wedge data.

The data provided by the invention typically supply information about spatial frequency, however several transformations can be considered in addition to a discrete Fourier transform, including a discrete cosine transform and a Hadamard transform. The software, method, and system of the invention permits the inclusion of arbitrary image preprocessing and ring-wedge data post-processing, as well as various machine learning techniques through a modular design.

To reiterate, the present invention comprises methods and software for calculating numerically the ring-wedge data format from digital images. This includes but is not limited to calculations involving a discrete Fourier transform and a discrete autocorrelation, as well as other discrete transforms such as a discrete cosine transform or a Hadamard transform, which provide a point-centered frame of reference on which to perform the ring-wedge sampling.

In the preferred embodiment, the ring-wedge sampling is performed using the discrete Fourier transform (DFT) of the input digital imagery, defined as follows:

$$\tilde{F}(u, v) = \sum_{n=0}^{N-1} \sum_{m=0}^{M-1} f(n, m) \exp\left[-2\pi\left(\frac{un}{N} + \frac{vm}{M}\right)\right], \quad (1)$$

where f(n,m) is the digital array image with $0 \leq n < N$, $0 \leq u < N$, $0 \leq m < M$, and $0 \leq v < M$.

In general using this all-digital system, the computer system can utilize both the phase as well as the amplitude of the DFT, $\tilde{F}(u, v)$. This possibility produces interesting variations of the system. As an example of the system, the following discussion presents a system that uses the absolute value of the transform, i.e, $|\tilde{F}(u, v)|$. For this example, the ring-wedge data are described by the following equation:

$$m_j = \sum_{u=0}^{N-1} \sum_{v=0}^{M-1} |\tilde{F}(u, v)| M_j(\tilde{u}, v). \quad (2)$$

where $m_j$ is the jth measurement over the sampling area to which each pixel's degree of membership is defined by the sampling geometry given by $M_j(u, v)$. The nature of this sampling geometry is described in the following paragraph.

The ring-wedge detector geometry consists of semi-annular sampling areas on one half of the sampling plane and wedge-shaped sampling areas on the other. The separate samplings over 180 degrees are based on the use of the assertion that sampling be polar symmetric, as is the case with the amplitude transmittance of the DFT of a real valued input image. When using the DFT, the radial sampling of the ring areas provides orientation-independent information about the distribution of spatial frequencies in the image while the angular sampling of the wedge areas provides scale-independent information about the orientations of those spatial frequencies. These interpretations, however, are variant with use of alternate transformations of the input image data into other appropriate sampling domains. In any case, the ring-wedge data format efficiently summarizes the information contained within an input image into a few measurements, representing a large reduction in the amount of data that the recognition system must analyze. This is an important advantage when considering machine learning methods.

When considering the digital calculation of the ring-wedge data format, a direct approach is to treat the pixels in the sampling plane as isolated points and to calculate the ring-wedge measurements by summing together the contributions from each of the sample points within corresponding detector regions of the sampling geometry.

To develop this approach, consider it in the Fourier domain as a method of approximating the following integral definition of each of the detector measurements:

$$m_j = \int_{R_j} \int df_x \, df_y |F(f_x, f_y)|, \quad (3)$$

where $F(f_x, f_y)$ is the continuous Fourier transform of the ideal continuous reconstruction of the sample's array image used as input to the system.

The approximation is made by subdividing the Fourier plane on a regular rectangular grid with spacings of $\Delta f_x$ and $\Delta f_y$ in the $f_x$ and $f_y$ directions, respectively. For each rectangle covering a sampling region $R_j$, employ the center point $(u\Delta f_x, v\Delta f_y)$ and take the product of $F(u\Delta f_x, v\Delta f_y)$ with the area of the rectangle, $\Delta f_x \Delta f_y$. The sum of all such products over the region gives the corresponding measurement, as described by the equation:

$$m_j \approx \sum_u \sum_v |F(u\Delta f_x, v\Delta f_y)| \Delta f_x \Delta f_y. \quad (4)$$

In Eq. (4), the summation is over all ordered pairs of the integers u and v belonging to the discrete set $\{(u, v): (u\Delta f_x, v\Delta f_y) \in R_j\}$. Note what is done with a rectangle that is on a boundary of $R_j$ with only part of its area contained within the detector region. In this case, the rectangle is considered to be within the detector region only if the center point of the rectangle lies within the region.

One can describe the ring-wedge sampling geometry explicitly. The sampling regions for the ring-detector regions are described as follows:

$$R_j = \quad (5)$$

$$\left\{(f_x, f_y): \rho_j \leq \sqrt{f_x^2 + f_y^2} < \rho_j + \Delta\rho_j, \phi_{min} \leq \tan^{-1}\frac{f_y}{f_x} < \phi_{min} + \pi\right\},$$

where $\rho_j$ is the radial distance from the origin to the inner radius of the jth detector region, and $\Delta\rho_j$ is its radial width. Note that the angular extent of all of the ring detectors is assumed to be $\pi$ radians oriented as given by $\phi$min. The sampling regions for the wedge detector regions are described as follows:

$$R_j = \left\{(f_x, f_y): \rho_{min} \leq \sqrt{f_x^2 + f_y^2} < \rho_{max}, \phi_j \leq \tan^{-1}\frac{f_y}{f_x} < \phi_j + \Delta\phi_j\right\}, \quad (6)$$

where $\phi_j$ is the angular distance from the $f_x$ axis to the leading edge of the jth detector region and $\Delta\phi_j$ is its angular width. Note that the radial extent of all of the wedge detectors is assumed to be equal, as given by $\rho_{min}$ and $\rho_{max}$.

By approximating $F(u\Delta f_x, v\Delta f_y)$ with the two-dimensional discrete Fourier transform and by recalling the implicit periodicity of the DFT, one obtains Eq. (2) with the pixel membership of the detector regions defined such that $M_j(u, v)$ has a value of unity for a pixel that is contained in the sampling region and zero otherwise. This approach is known as bin-summing because it can be implemented as a simple pooling of pixel values for cases where the detector regions do not overlap.

Figure 2:
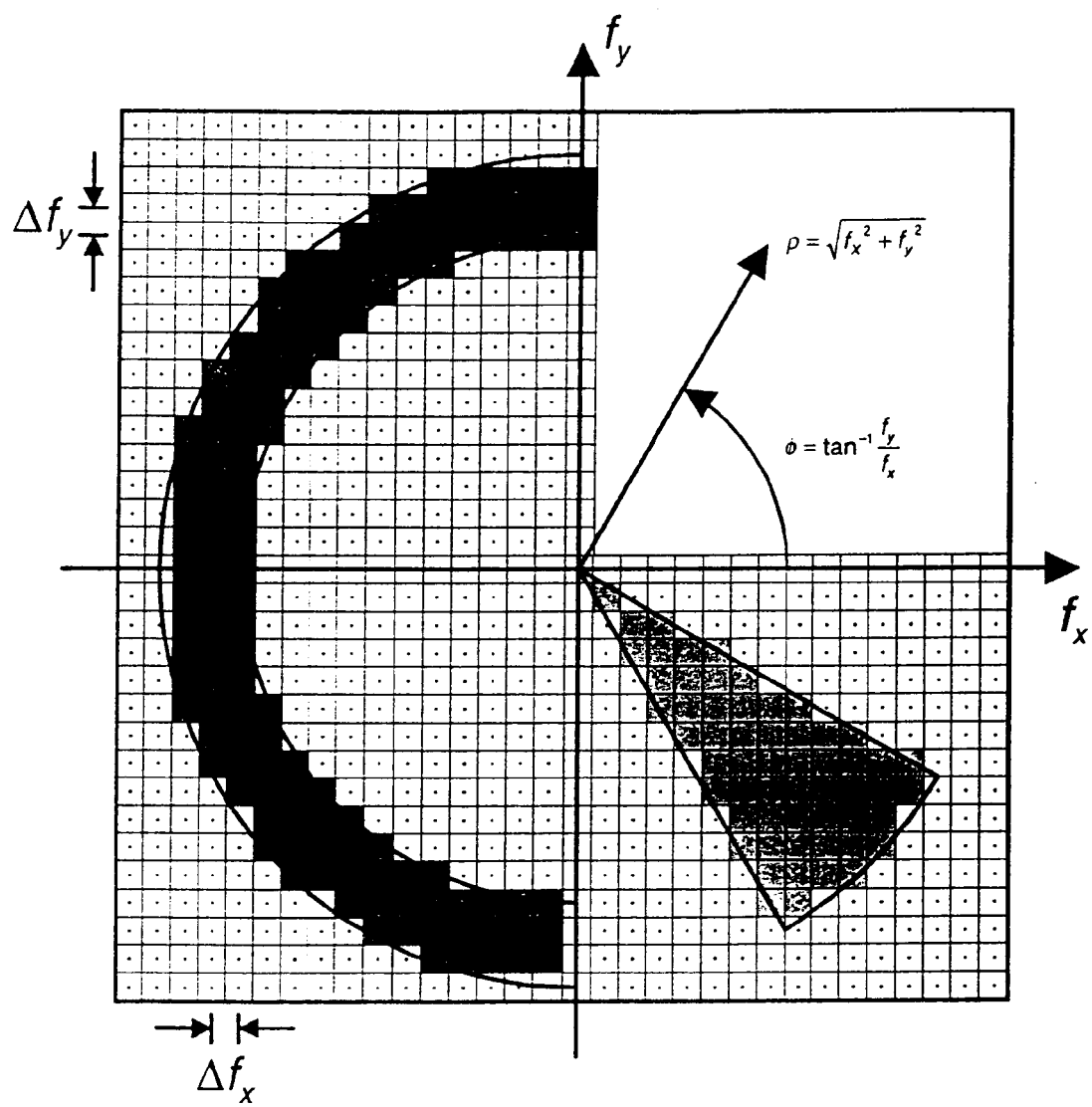
FIG. 2 is a representational diagram of the calculations involved in calculating the ring-wedge data format using the bin-summing method of the invention.

Referring to FIG. 2, the bin-summing method of the invention is preferably implemented as follows: First, the membership function for all of the sampling regions are defined according to the prescribed detector geometry and a given image size. Second, for each pixel location the polar coordinates are calculated according to its relative position from the detector center. The region in which the pixel belongs is then determined using these coordinates. This information can either be stored in a lookup table or used directly in calculating the ring-wedge samples. Last, for a particular image the magnitude of the DFT coefficient at each of the pixel locations is summed into its corresponding bin according to the determined region membership.

Once a lookup table is generated for a particular sampling geometry and image size, a second execution stage is entered in which images are transformed and ring-wedge data calculated by a scan through the DFT coefficients. This two-stage approach to the method eliminates the need to calculate repetitively the polar coordinates of a each pixel location during the ring-wedge calculations of every image considered. When dealing with a large number of images, eliminating these extra coordinate calculations represents a substantial time savings over a single stage implementation of the bin-summing method.

Figure 3:
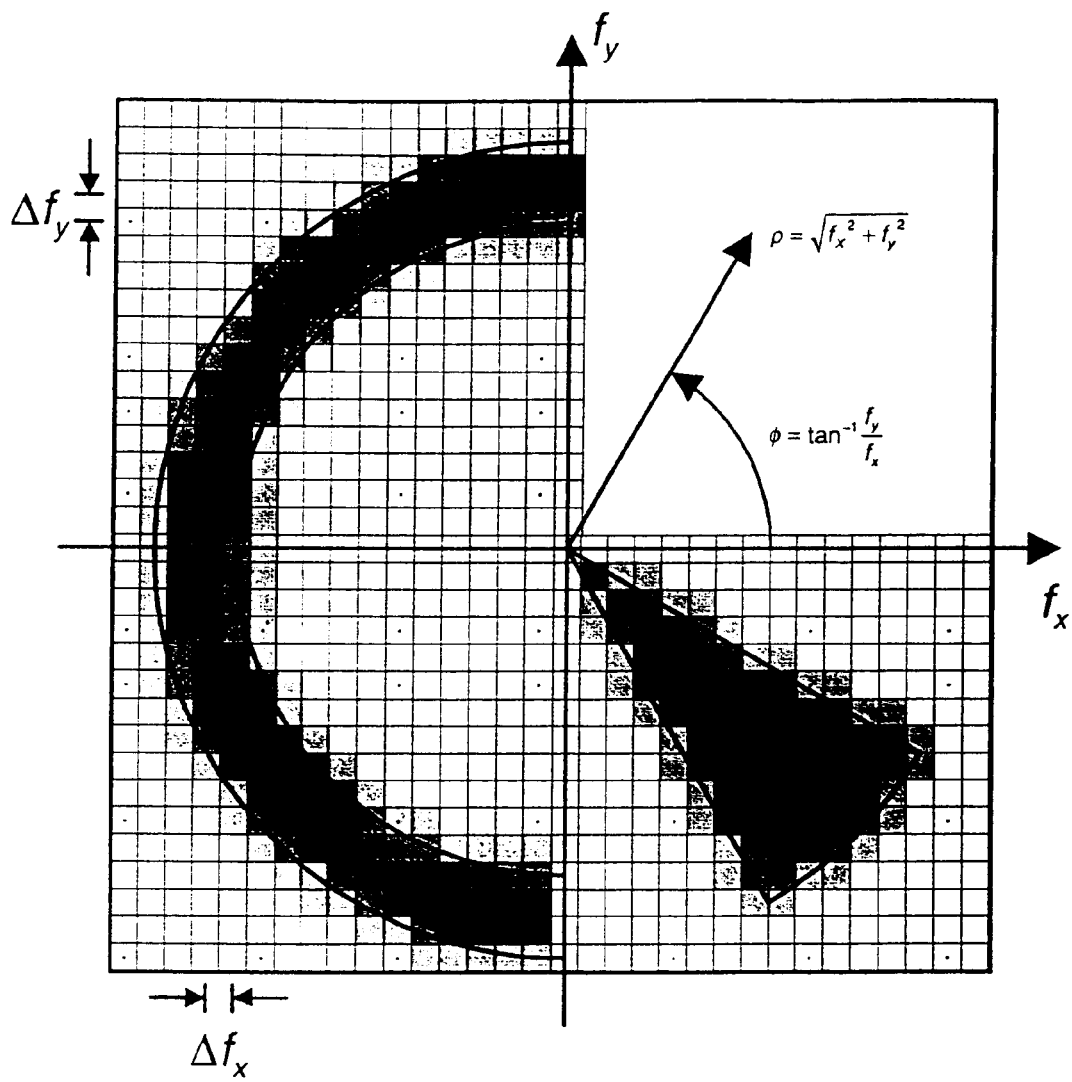
FIG. 3 is a representational diagram of the calculations involved in calculating the ring-wedge data format using the mask-summing method of the invention.

While computationally efficient, bin-summing can contain artifacts which compromise desired invariances and degrade recognition performance. This is especially true when dealing with small images. Bin-summing is most appropriate when working with images larger than 128×128 pixels. With smaller sized imagery, it is preferred to use an alternate method of the invention known as mask-summing, representationally illustrated in FIG. 3.

In developing this method, one should consider a result from sampling theory, namely, that |F(u, v)| can be represented by samples taken on a rectangular grid with horizontal spacing $\Delta f_x$ and vertical spacing $\Delta f_y$:

$$|F(f_x, f_y)| \approx \sum_{u=-\infty}^{\infty} \sum_{v=-\infty}^{\infty} |F(u\Delta f_x, v\Delta f_y)| I(f_x - u\Delta f_x, f_y - v\Delta f_y), \quad (7)$$

where $I(f_x, f_y)$ is an interpolating function.

Substituting Eq. (7) into Eq. (3) results in the following:

$$m_j \approx \int_{R_j}\int df_x df_y \left[ \sum_{u=-\infty}^{\infty} \sum_{v=-\infty}^{\infty} |F(u\Delta f_x, v\Delta f_y)| I(f_x - u\Delta f_x, f_y - v\Delta f_y) \right]. \quad (8)$$

Further, by bringing the integral inside of the summation, one obtains the following result:

$$m_j \approx \sum_{u=-\infty}^{\infty} \sum_{v=-\infty}^{\infty} |F(u\Delta f_x, v\Delta f_y)| \left[ \int_{R_j}\int df_x df_y I(f_x - u\Delta f_x, f_y - v\Delta f_y) \right]. \quad (9)$$

Thus, by defining $$M_j(u\Delta f_x, v\Delta f_y)\Delta f_x \Delta f_y = \int_{R_j}\int df_x df_y I(f_x - u\Delta f_x, f_y - v\Delta f_y) \quad (10)$$

one obtains:

$$m_j \approx \sum_{u=-\infty}^{\infty} \sum_{v=-\infty}^{\infty} |F(u\Delta f_x, v\Delta f_y)| M_j(u\Delta f_x, v\Delta f_y)\Delta f_x \Delta f_y. \quad (11)$$

Assuming that $F(f_x, f_y)$ can be approximated using discrete Fourier transform and accounting for periodicity, one again obtains Eq. (2), where the individual ring-wedge measurements are calculated by summing together values from all of the DFT coefficients, which have first been multiplied by corresponding mask values. As described above, the mask values are calculated numerically by approximating the contribution of each pixel to a particular detector region. There is a separate mask for each of the sampling regions in a given geometry.

The mask-summing method of the invention is preferably implemented as follows: First, the mask values for each of the sampling regions are calculated according to the pre-scribed detector geometry. For this step, an interpolating function is chosen and Eq. (10) is evaluated numerically.

After the mask values of each of the detector regions are calculated for a particular image size and detector geometry, ring-edge data can be generated for a particles image by successively multiplying the DFT coefficients by each mask in the detector and summing over the affected pixels.

For either of the two calculation methods, input image data is transformed into one of several possible sampling domains and a reduced set of data measurements is calculated. As such, the methods permit any combination of image preprocessing and ring-wedge data postprocessing to allow the software to be incorporated in a practical recognition system. Several permutations of this are presented in accompanying drawings (FIGS. 4–11).

Figure 4:
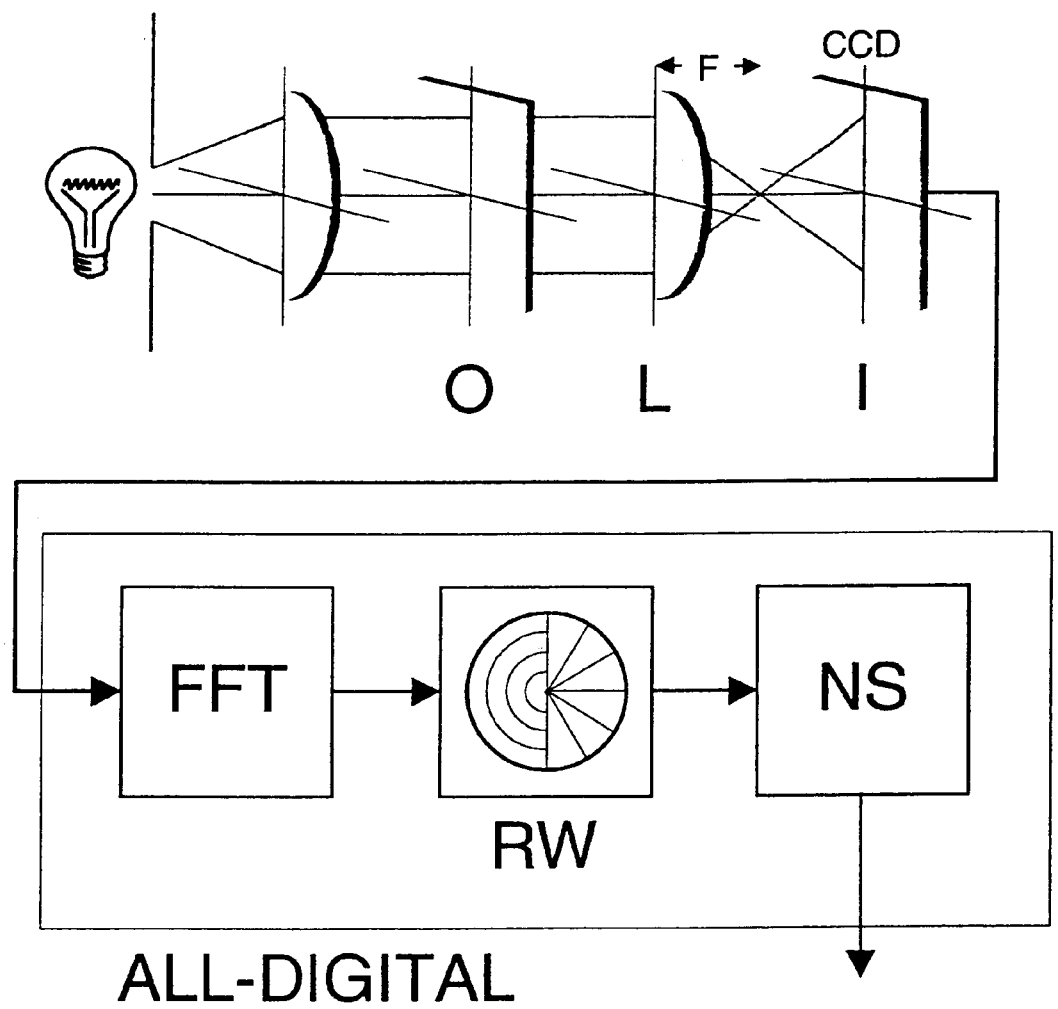
FIG. 4 is a block diagram of the invention configured as a discrete Fourier spectral sampling system.

FIG. 4 is a block diagram of the invention configured as a discrete Fourier spectral sampling system with the following components: O, input object; L, imaging lens; I, image sampling system; FFT, fast Fourier transform; RW, digital ring-wedge detector; and NS, neural-network software, hardware, or hybrid system.

Figure 5:
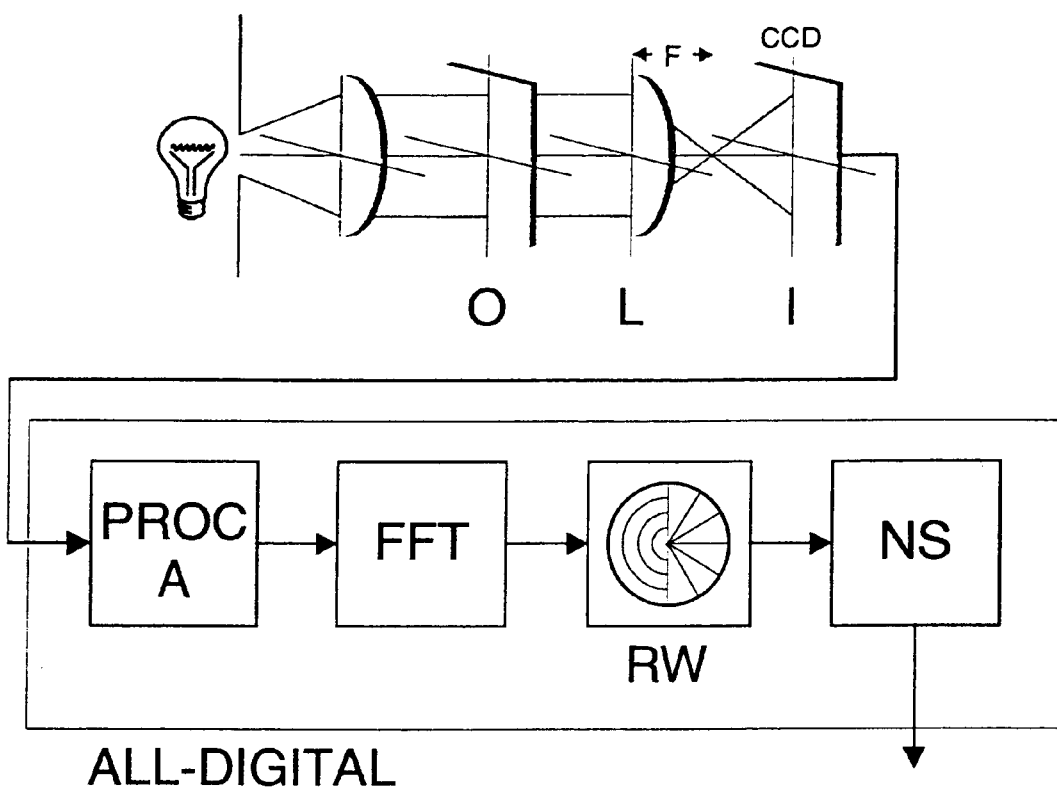
FIG. 5 is a block diagram of the system/method of the invention as a discrete Fourier spectral sampling incorporating image preprocessing.

FIG. 5 is a block diagram of the system/method of the invention as a discrete Fourier spectral sampling incorporating image preprocessing, having the following components: O, input object; L, imaging lens; I, image sampling system; PROC A, image preprocessing; FFT, fast Fourier transform; RW, digital ring-wedge detector; and NS, neural-network software, hardware, or hybrid system.

Figure 6:
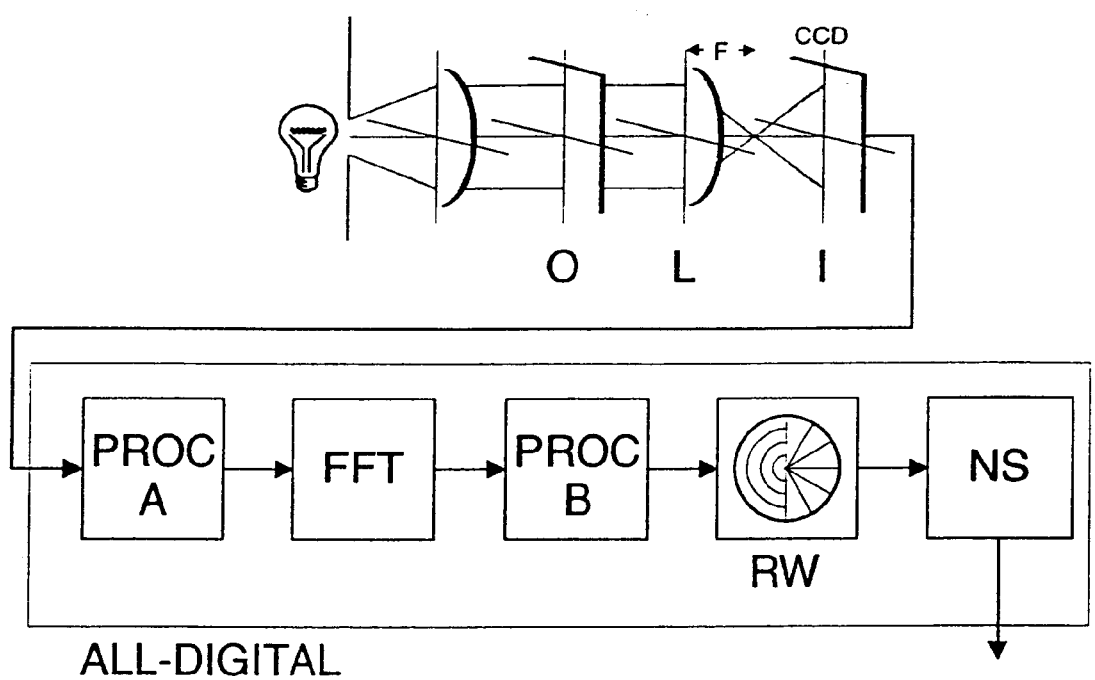
FIG. 6 is a block diagram of the system/method of the invention as a discrete Fourier spectral sampling incorporating both image- and transform-domain preprocessing.

FIG. 6 is a block diagram of the system/method of the invention as a discrete Fourier spectral sampling incorporating both image- and transform-domain preprocessing, having the following components: O, input object; L, imaging lens; I, image sampling system; PROC A, image-domain preprocessing; PROC B, transform-domain preprocessing; FFT, fast Fourier transform; RW, digital ring-wedge detector; and NS, neural-network software, hardware, or hybrid system.

Figure 7:
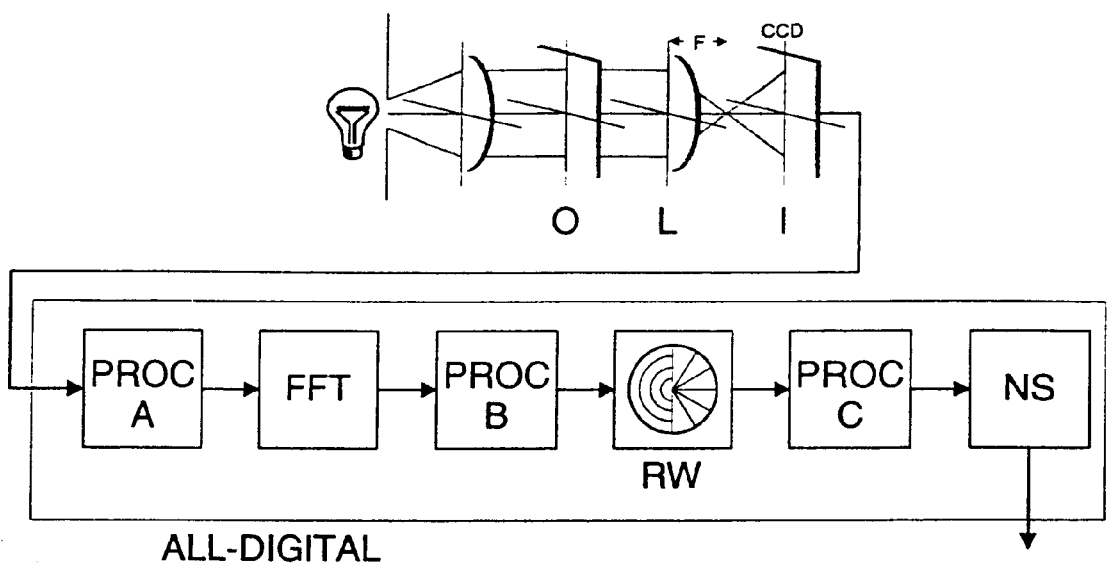
FIG. 7 is a block diagram of the system/method of the invention as a discrete Fourier spectral sampling incorporating both image- and transform-domain preprocessor, as well as ring-wedge data postprocessing.

FIG. 7 is a block diagram of the system/method of the invention as a discrete Fourier spectral sampling incorporating both image- and transform-domain preprocessor, as well as ring-wedge data postprocessing, having the following components: O, input object; L, imaging lens; I, image sampling system; PROC A, image-domain preprocessing; PROC B, transform-domain preprocessing; PROC C, ring-wedge data postprocessing; FFT, fast Fourier transform; RW digital ring-wedge detector; and NS, neural-network'software, hardware, or hybrid system.

Figure 8:
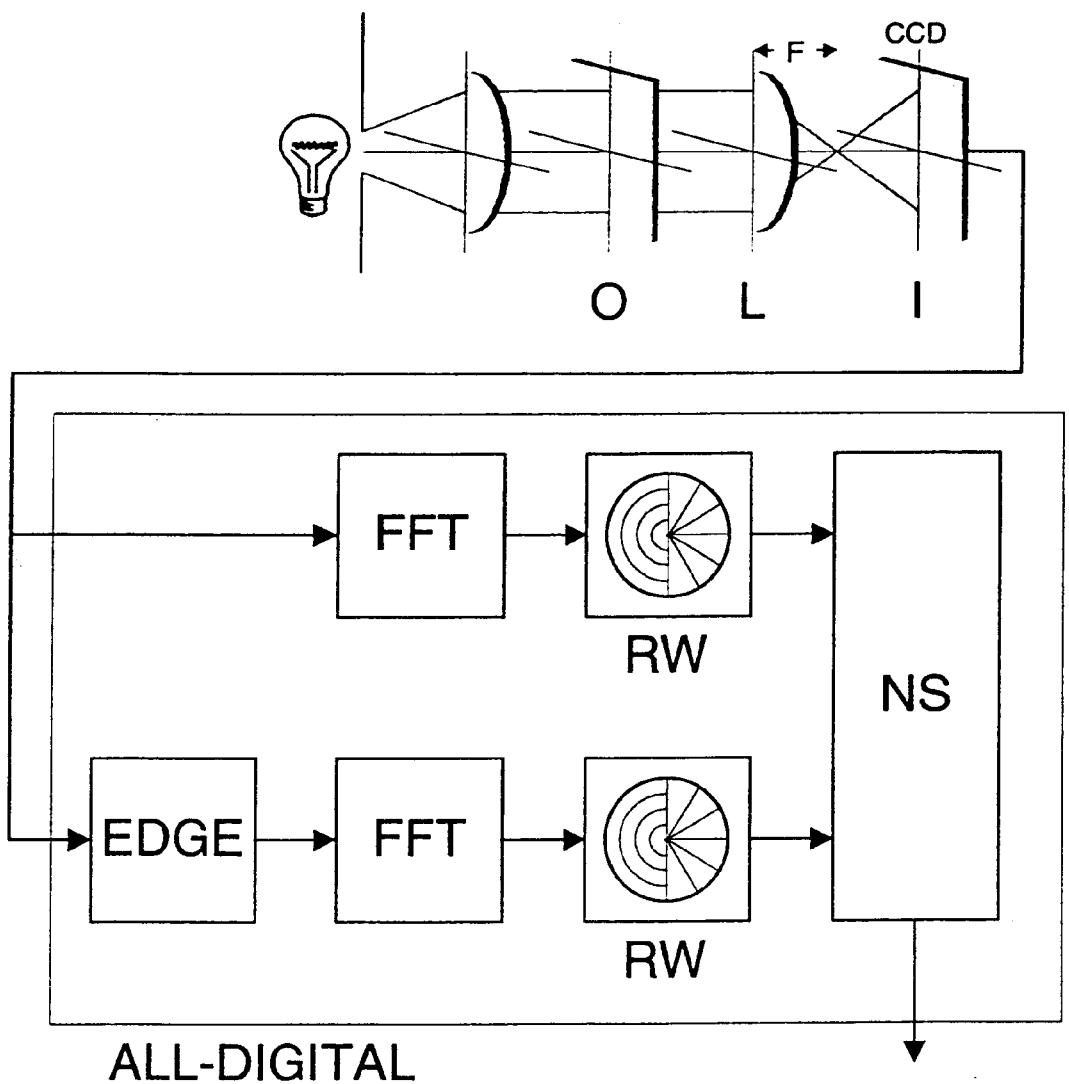
FIG. 8 is a block diagram of the system/method of the invention tailored for image quality assessment using two separate ring-wedge data channels.

FIG. 8 is a block diagram of the system/method of the invention tailored for image quality assessment using two separate ring-wedge data channels. The first channel obtains ring-wedge data directly from the grayscale image. The second channel obtains ring-wedge data from a synthetic image generated from an edge enhancement of the input image. The following components are employed: O, input object; L, imaging lens; I, image sampling system; EDGE, image-domain preprocessing, edge enhancement; FFT, fast Fourier transform; RW, digital ring-wedge detector; and NS, neural-network software, hardware, or hybrid system.

Figure 9:
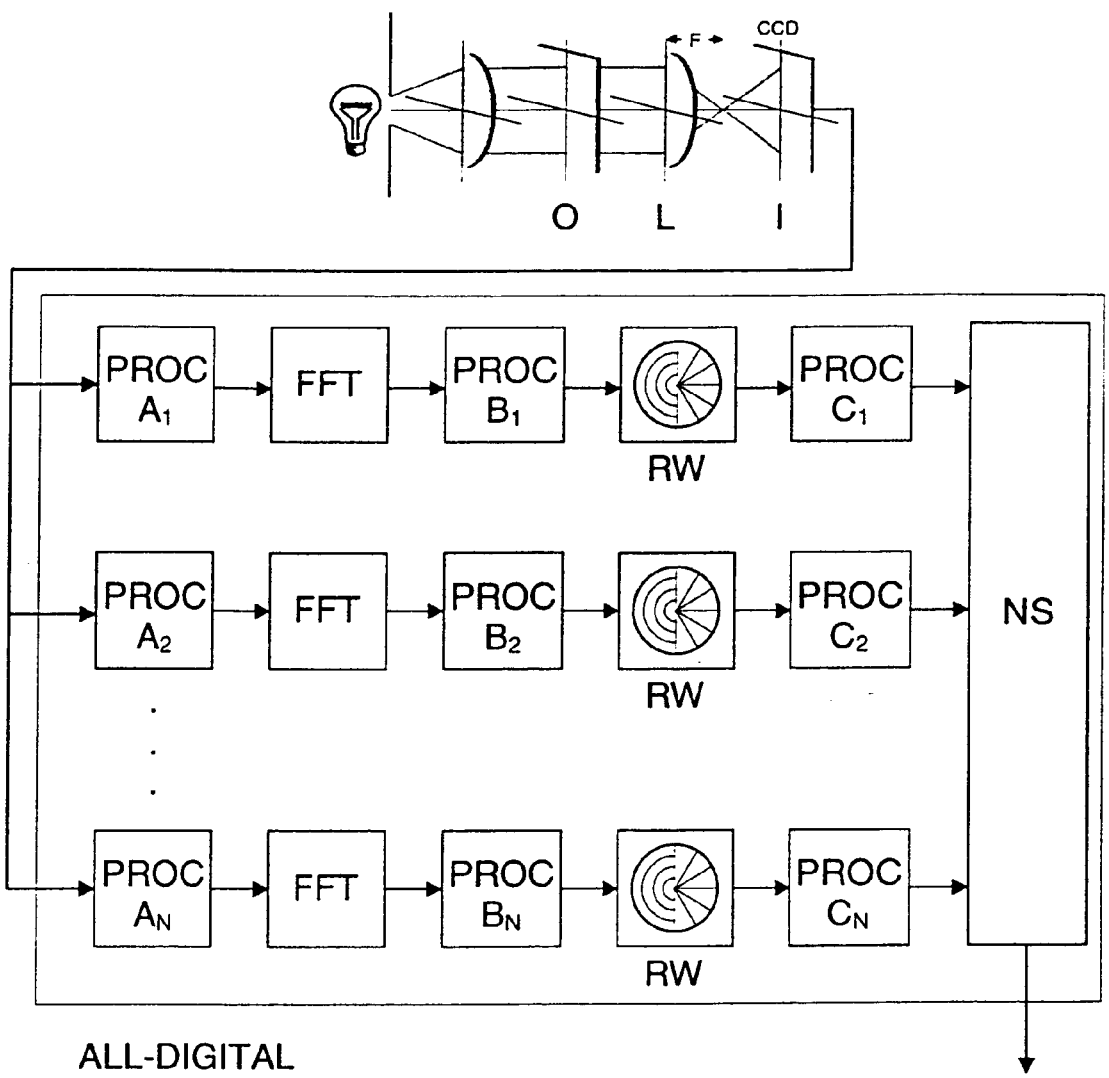
FIG. 9 is a block diagram of the system/method of the invention as a multichannel discrete Fourier spectral sampling system incorporating different image- and transform-domain preprocessing, as well as ring-wedge data postprocessing for each of the channels.

FIG. 9 is a block diagram of the system/method of the invention as a multichannel discrete Fourier spectral sampling system incorporating different image- and transform-domain preprocessing, as well as ring-wedge data postprocessing for each of the channels, having the following components: O, input object; L, imaging lens; I, image sampling system; PROC $A_n$, image-domain preprocessing for the nth channel; PROC $B_n$, transform-domain preprocessing for the nth channel; PROC $C_n$, ring-wedge data postprocessing for the nth channel; FFT, fast Fourier transform; RW, digital ring-wedge detector; and NS, neural-network software, hardware, or hybrid system.

Figure 10:
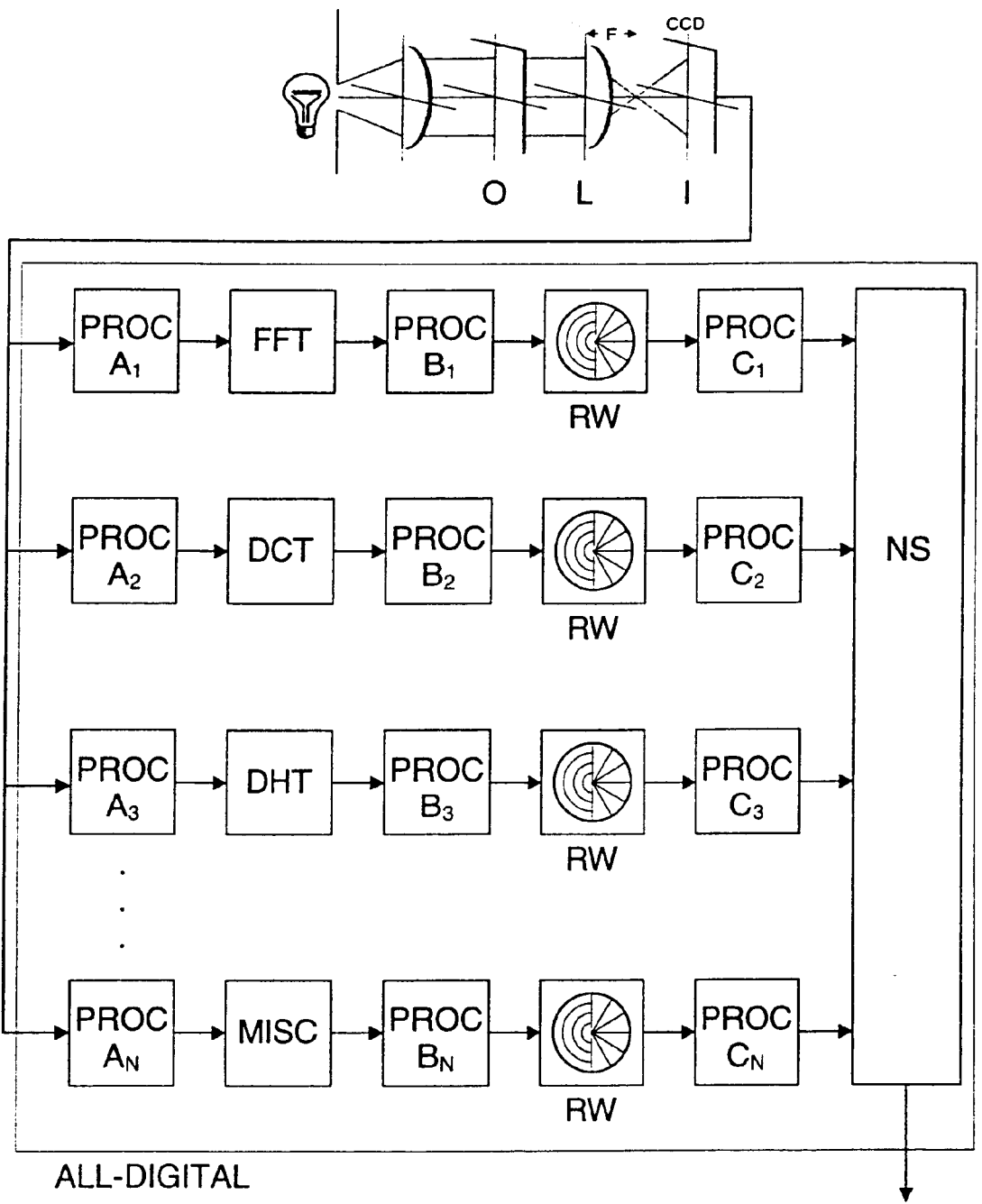
FIG. 10 is a block diagram of the system/method of the invention as a multichannel sampling system incorporating different spatial transforms, image- and transform-domain preprocessing, and ring-wedge data postprocessing for each of the channels.

FIG. 10 is a block diagram of the system/method of the invention as a multichannel sampling system incorporating different spatial transforms, image- and transform-domain preprocessing, and ring-wedge data postprocessing for each of the channels, having the following components: O, input object; L, imaging lens; I, image sampling system; PROC $A_n$, image-domain preprocessing for the nth channel; PROC $B_n$, transform-domain preprocessing for the nth channel; PROC $C_n$, ring-wedge data postprocessing for the nth channel; FFT, fast Fourier transform; DCT, discrete cosine transform; DHT, discrete Hadamard transform; MISC, other spatial transform; RW, digital ring-wedge detector; and NS, neural-network software, hardware, or hybrid system.

Figure 11:
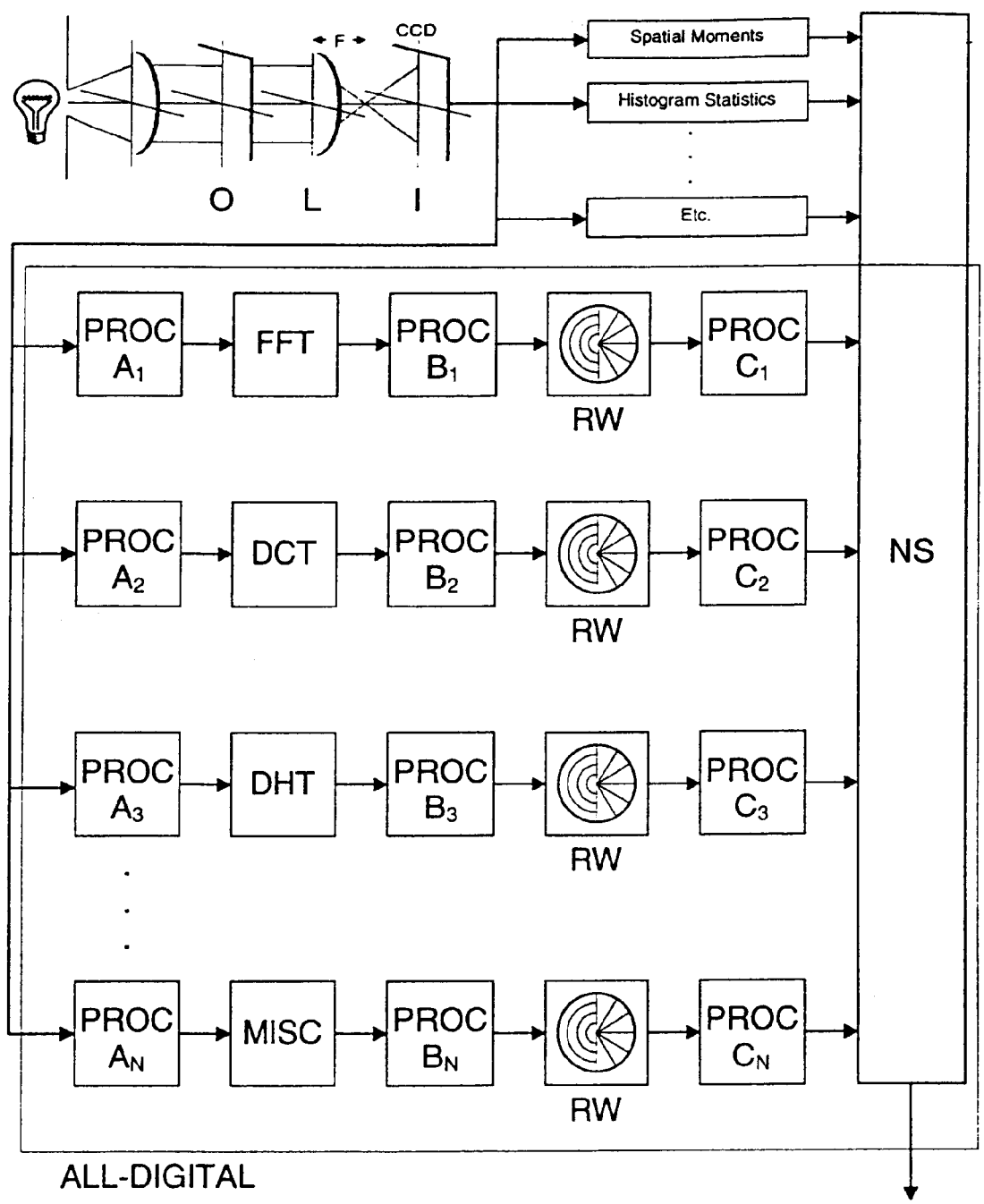
FIG. 11 is a block diagram at the system of the invention as a multichannel sampling system incorporating various image domain features, as well as ring-wedge data calculated using different spatial transforms, image- and transform-domain preprocessing, and ring-wedge data postprocessing for each of the channels.

FIG. 11 is a block diagram at the system of the invention as a multichannel sampling system incorporating various image domain features, as well as ring-wedge data calculated using different spatial transforms, image- and transform-domain preprocessing, and ring-wedge data postprocessing for each of the channels, having the following components: O, input object; L, imaging lens; I, image sampling system; PROC $A_n$, image-domain preprocessing for the nth channel; PROC $B_n$, transform-domain preprocessing for the nth channel; PROC $C_n$, ring-wedge data postprocessing for the nth channel; FFT, fast Fourier transform; DCT, discrete cosine transform; DHT, discrete Hadamard transform; MISC, other spatial transform; RW, digital ring-wedge detector; and NS, neural-network software, hardware, or hybrid system.

Figure 12:
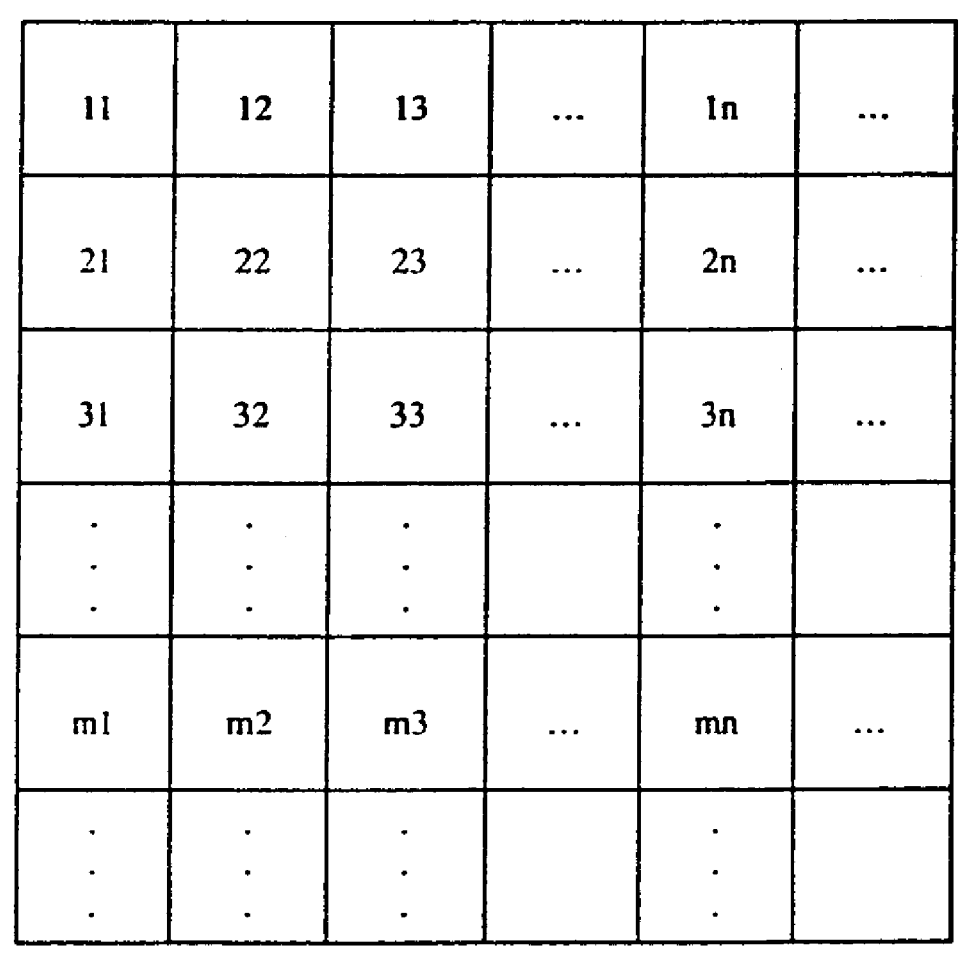
Figure 13:
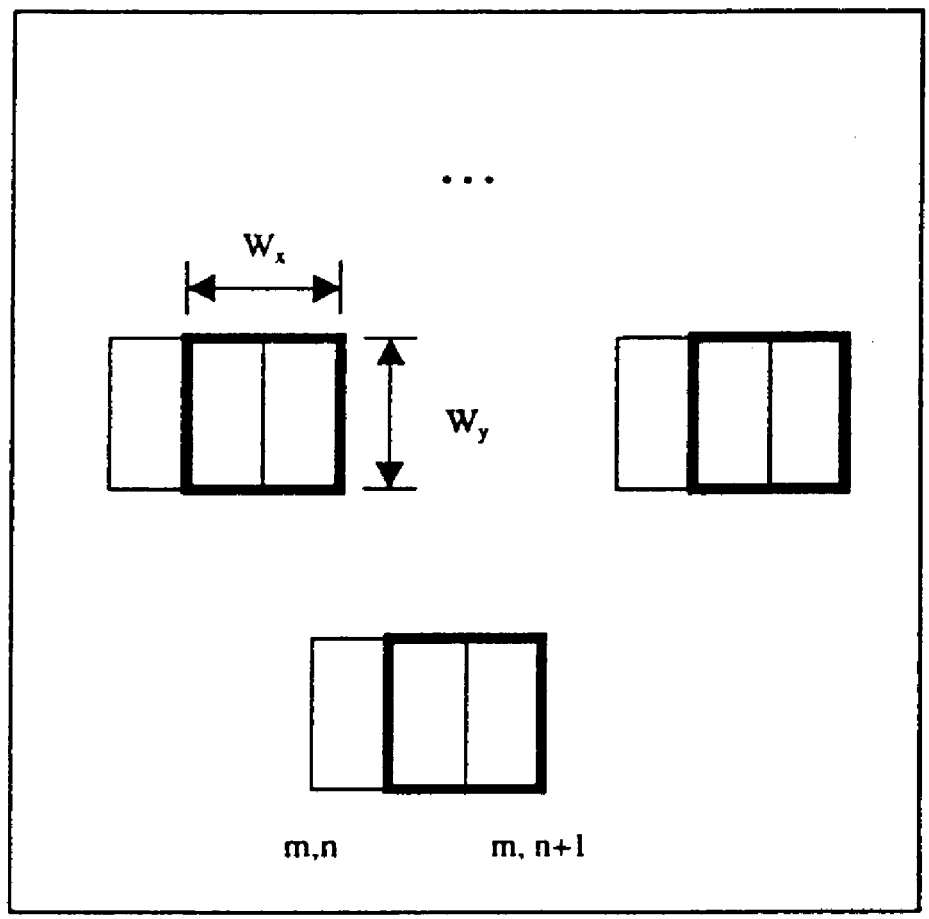
FIG. 13 is a schematic representation of image rastering according to the invention.

Two methods are preferred for extracting subimages for analysis according to the invention. FIG. 12 illustrates image tiling according to the invention. For this image the squares represent non-overlapping, identically shaped pixel regions. For each of these regions a subimage is extracted and the ring-wedge data are calculated giving information about the local image content at each of the tiled locations. FIG. 13 illustrates image rastering according to the invention. For this image, the squares represent identically shaped pixel regions that overlap in a prescribed raster pattern. For each of these regions a subimage is extracted and the ring-wedge data is calculated giving information about the local image content at each of the raster locations.

Industrial Applicability

The invention is further illustrated by the following non-limiting examples.

For facial recognition, the all-digital ring-wedge system of the invention, incorporating a direct image channel as well, has demonstrated excellent results. A particular feature of the invention is that it can recognize faces over an angle of +/−45 degrees as the head is turned, even though the original training was done only with direct front views of the head. This general insensitivity to orientation is an important feature of the use of spatial transform sampling. More specifically, with proper assembly of the training set and in preparing the neural network, one can devise neural networks that are relatively insensitive to orientation, scale, contrast, or background clutter.

It is important to recognize that the neural networks being generated can be regarded as new software products that are transportable and useful in remote computers. These completed neural networks can be thought of as extremely compact matched filters, like an identification card. The finished or trained neural network can be recorded on a chip or a magnetic strip and it is an extremely compact storage device—orders of magnitude fewer bytes, say, than the original image. This is best illustrated by a description of an entryway application. A person presents an identification card, such as a passport; and it has both a photograph and a fingerprint. For the fingerprint alone, typically, 8,000 bytes are required for storing the entire print. However, the neural network established by the present invention requires only 300 bytes. In effect, this trained neural network is an extremely efficient correlation filter. It provides a data compression of 8000/300, or better than 25 times. Accordingly, in the entryway application, it is preferable to include a magnetic strip or chip since this can be more easily handled in the computer than actually scanning the original thumbprint or face.

In remote sensing of satellite imagery, the typical application is to classify images automatically. For example, an exhaustive listing is made of 24 desired images and one other. A three-layer neural network with 25 output neurons can then be trained using a set of learning images. It was found that 3 to 5 learning images are useful in each category in order to obtain classification in the high 95 to 100 percent accuracy level. Again, the trained neural network is a separate, identifiable product with its own utility. This software product can also be reproduced in a fast chip form in well-known methods. It is anticipated that the trained neural network in software or hardware will be widely used in wearable computer applications.

The importance of images is going to increase substantially. While presently the assessment of image quality is a task for human photointerpreters, in the future it will be extremely helpful to automate the assessment of image quality. For this application and using the methods described herein, it has been found that this is possible and practical. Using a data set of several hundred images of widely varying content, degraded images were prepared using lossy JPEG compression and recovery. With five categories of quality it was found that 95% accuracy was obtained in assessing image quality. Moreover, this assessment was possible without knowledge of the original and also widely independent of scene content. This trained network has direct application to photofinishing machines and to digital painters.

Another important industrial application is the sorting of images into categories, e.g., for automating digital printing. The present invention has successfully segmented images into 16 to 400 separate sub-images. In one application using 16 sub-images, contents on a page as follows were accurately classified: type 1 photographs, line drawings, halftones, as well as color versus non-color.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of calculating ring-wedge data from a digital image comprising the step of performing a discrete Fourier transform of the digital image, wherein the ring-wedge data are segmented into a plurality of unsegmented semi-circular annular rings and a plurality of unsegmented pie-shaped wedges, and wherein the performing step comprises calculating $$m_j = \sum_{u=0}^{N-1} \sum_{v=0}^{M-1} |\tilde{F}(u,v)| \tilde{M}_j(u,v),$$

where $m_j$ is a jth measurement over a sampling area to which each pixel's degree of membership is given by $\tilde{M}_j(u,v)$, $$\tilde{F}(u,v) = \sum_{n=0}^{N-1} \sum_{m=0}^{M-1} f(n,m) \exp\left[-2\pi\left(\frac{un}{N} + \frac{vm}{M}\right)\right],$$

and where f(n,m) comprises digital image pixel values with $0 \leq n < N$, $0 \leq u < N$, $0 \leq m < M$, and $0 \leq v < M$.

2. The method of claim 1 additionally comprising the step of performing a calculation of discrete autocorrelation.

3. The method of claim 1 wherein the calculating step comprises determining each pixel's degree of membership by bin-summing.

4. The method of claim 3 wherein the bin-summing step comprises employing sampling regions for ring and wedge regions defined as:

$$R_j = \left\{(f_x, f_y): \rho_j \leq \sqrt{f_x^2 + f_y^2} < \rho_j + \Delta\rho_j, \phi_{\min} \leq \tan^{-1}\frac{f_y}{f_x} < \phi_{\min} + \pi\right\},$$

and $$R_j = \left\{(f_x, f_y): \rho_{\min} \leq \sqrt{f_x^2 + f_y^2} < \rho_{\max}, \phi_j \leq \tan^{-1}\frac{f_y}{f_x} < \phi_j + \Delta\phi_j\right\},$$

where $\rho_j$ is the radial distance from the origin to the inner radius of the jth detector region, and $\Delta\rho_j$ is its radial width, and $\phi_j$ is the angular distance from the $f_x$ axis to the leading edge of the jth detector region and $\Delta\phi_j$ is its angular width.

5. The method of claim 3 wherein the calculating step comprises determining each pixel's degree of membership by mask-summing.

6. The method of claim 1 additionally comprising the step of providing the ring-wedge data to a neural network to perform pattern recognition on the data.

7. The method of claim 6 wherein the providing step comprises providing the data to a fully connected, three-layer, feed-forward neural network.

8. The method of claim 6 wherein the providing step comprises providing the data to a neural network with sigmoidal activation functions.

9. The method of claim 1 additionally comprising the step of employing the ring-wedge data in analysis of a fingerprint image.

10. The method of claim 1 additionally comprising the step of employing the ring-wedge data in an object recognition analysis of the image.

11. The method of claim 1 additionally comprising the step of performing a calculation of discrete cosine transform.

12. The method of claim 1 additionally comprising the step of performing a calculation of Hadamard transform.

13. The method of claim 1 additionally comprising the step of employing the ring-wedge data in analysis of an image of particles.

14. The method of claim 1 additionally comprising the step of employing the ring-wedge data in analysis of an image of human faces.

15. The method of claim 1 additionally comprising the step of employing the ring-wedge data in analysis of a satellite image.

16. The method of claim 1 additionally comprising the step of employing the ring-wedge data in an image quality assessment analysis of the image.

17. The method of claim 1 additionally comprising the step of employing the ring-wedge data in an image content classification analysis of the image.

18. A computer apparatus for calculating ring-wedge data from a digital image comprising computer software code performing a discrete Fourier transform of the digital image, wherein the ring-wedge data are segmented into a plurality of unsegmented semi-circular annular rings and a plurality of unsegmented pie-shaped wedges, and wherein said transform code comprises code calculating $$m_j = \sum_{u=0}^{N-1} \sum_{v=0}^{M-1} |\tilde{F}(u,v)| \tilde{M}_j(u,v),$$

where $m_j$ is a jth measurement over a sampling area to which each pixel's decree of membership is given by $\tilde{M}_j(u,v)$, $$\tilde{F}(u,v) = \sum_{n=0}^{N-1} \sum_{m=0}^{M-1} f(n,m) \exp\left[-2\pi\left(\frac{un}{N} + \frac{vm}{M}\right)\right],$$

and where r(n,m) comprises digital image pixel values with $0 \leq n < N$, $0 \leq u < N$, $0 \leq m < M$, and $0 \leq v < M$.

19. The computer apparatus of claim 18 additionally comprising code performing a calculation of discrete autocorrelation.

20. The computer apparatus of claim 18 wherein said calculating code comprises code determining each pixel's degree of membership by bin-summing.

21. The computer apparatus of claim 20 wherein said bin-summing code comprises code employing sampling regions for ring and wedge regions defined as:

$$R_j = \left\{(f_x, f_y): \rho_j \leq \sqrt{f_x^2 + f_y^2} < \rho_j + \Delta\rho_j, \phi_{\min} \leq \tan^{-1}\frac{f_y}{f_x} < \phi_{\min} + \pi\right\},$$

and $$R_j = \left\{(f_x, f_y): \rho_{\min} \leq \sqrt{f_x^2 + f_y^2} < \rho_{\max}, \phi_j \leq \tan^{-1}\frac{f_y}{f_x} < \phi_j + \Delta\phi_j\right\},$$

where $\rho_j$ is the radial distance from the origin to the inner radius of the jth detector region, and $\Delta\rho_j$ is its radial width, and $\phi_j$ is the angular distance from the $f_x$ axis to the leading edge of the jth detector region and $\Delta\phi_j$ is its angular width.

22. The computer apparatus of claim 20 wherein said calculating code comprises code determining each pixel's degree of membership by mask-summing.

23. The computer apparatus of claim 18 additionally comprising a neural network performing pattern recognition on the ring-wedge data.

24. The computer apparatus of claim 23 wherein said neural network comprises a fully connected, three-layer, feed-forward neural network.

25. The computer apparatus of claim 23 wherein said neural network comprises a neural network with sigmoidal activation functions.

26. The computer apparatus of claim 18 additionally comprising means for employing said ring-wedge data in analysis of a fingerprint image.

27. The computer apparatus of claim 18 additionally comprising means for employing said ring-wedge data in an object recognition analysis of the image.

28. The computer apparatus of claim 18 additionally comprising code performing a calculation of discrete cosine transform.

29. The computer apparatus of claim 18 additionally comprising code performing a calculation of Hadamard transform.

30. The computer apparatus of claim 18 additionally comprising means for employing said ring-wedge data in analysis of an image of particles.

31. The computer apparatus of claim 18 additionally comprising means for employing said ring-wedge data in analysis of an image of human faces.

32. The computer apparatus of claim 18 additionally comprising means for employing said ring-wedge data in analysis of a satellite image.

33. The computer apparatus of claim 18 additionally comprising means for employing said ring-wedge data in an image quality assessment analysis of the image.

34. The computer apparatus of claim 18 additionally comprising means for employing said ring-wedge data in an image content classification analysis of the image.

35. Computer storage media comprising software for calculating ring-wedge data from a digital image comprising code performing a discrete Fourier transform of the digital image, wherein the ring-wedge data are segmented into a plurality of unsegmented semi-circular annular rings and a plurality of unsegmented pie-shaped wedges, and wherein said transform code comprises code calculating $$m_j = \sum_{u=0}^{N-1} \sum_{v=0}^{M-1} |\tilde{F}(u, v)| \tilde{M}_j(u, v),$$

where $m_j$ is a jth measurement over a sampling area to which each pixel's degree of membership is given by $\tilde{M}_j(u,v)$, $$\tilde{F}(u, v) = \sum_{n=0}^{N-1} \sum_{m=0}^{M-1} f(n, m) \exp\left[-2\pi\left(\frac{un}{N} + \frac{vm}{M}\right)\right],$$

and where f(n,m) comprises digital image pixel values with $0 \leq n < N$, $0 \leq u < N$, $0 \leq m < M$, and $0 \leq v < M$.

36. The computer storage media of claim 35 additionally comprising code performing a calculation of discrete auto-correlation.

37. The computer storage media of claim 35 wherein said calculating code comprises code determining each pixel's degree of membership by bin-summing.

38. The computer storage media of claim 37 wherein said bin-summing code comprises code employing sampling regions for ring and wedge regions defined as:

$$R_j = \left\{(f_x, f_y): \rho_j \leq \sqrt{f_x^2 + f_y^2} < \rho_j + \Delta\rho_j, \phi_{min} \leq \tan^{-1}\frac{f_y}{f_x} < \phi_{min} + \pi\right\},$$

and $$R_j = \left\{(f_x, f_y): \rho_{min} \leq \sqrt{f_x^2 + f_y^2} < \rho_{max}, \phi_j \leq \tan^{-1}\frac{f_y}{f_x} < \phi_j + \Delta\phi_j\right\},$$

where $\rho_j$ is the radial distance from the origin to the inner radius of the jth detector region, and $\Delta\rho_j$ is its radial width, and $\phi_j$ is the angular distance from the $f_x$ axis to the leading edge of the jth detector region and $\Delta\phi_j$ is its angular width.

39. The computer storage media of claim 37 wherein said calculating code comprises code determining each pixel's degree of membership by mask-summing.

40. The computer storage media of claim 35 additionally comprising neural network code performing pattern recognition on the ring-wedge data.

41. The computer storage media of claim 40 wherein said neural network comprises a fully connected, three-layer, feed-forward neural network.

42. The computer storage media of claim 40 wherein said neural network comprises a neural network with sigmoidal activation functions.

43. The computer storage media of claim 35 additionally comprising means for employing said ring-wedge data in analysis of a fingerprint image.

44. The computer storage media of claim 35 additionally comprising means for employing said ring-wedge data in an object recognition analysis of the image.

45. The computer storage media of claim 35 additionally comprising code performing a calculation of discrete cosine transform.

46. The computer storage media of claim 35 additionally comprising code performing a calculation of Hadamard transform.

47. The computer storage media of claim 35 additionally comprising means for employing said ring-wedge data in analysis of an image of particles.

48. The computer storage media of claim 35 additionally comprising means for employing said ring-wedge data in analysis of an image of human faces.

49. The computer storage media of claim 35 additionally comprising means for employing said ring-wedge data in analysis of a satellite image.

50. The computer storage media of claim 35 additionally comprising means for employing said ring-wedge data in an image quality assessment analysis of the image.

51. The computer storage media of claim 35 additionally comprising means for employing said ring-wedge data in an image content classification analysis of the image.

* * * * *